(12) United States Patent
Jin et al.

(10) Patent No.: US 9,325,405 B2
(45) Date of Patent: Apr. 26, 2016

(54) METHOD FOR ANTENNA RECEIVING MODE CONFIGURATION PROCESSING, BASE STATION CONTROLLER AND BASE STATION

(71) Applicant: Huawei Technologies Co., Ltd., Shenzhen (CN)

(72) Inventors: Yu Jin, Shanghai (CN); Sheng Xu, Shanghai (CN); Wangjun Wu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 69 days.

(21) Appl. No.: 14/095,663

(22) Filed: Dec. 3, 2013

(65) Prior Publication Data

US 2014/0094184 A1    Apr. 3, 2014

Related U.S. Application Data

(63) Continuation of application No. PCT/CN2011/075282, filed on Jun. 3, 2011.

(51) Int. Cl.
*H04B 7/08* (2006.01)
*H04W 72/04* (2009.01)
*H04B 7/06* (2006.01)

(52) U.S. Cl.
CPC ............ *H04B 7/0814* (2013.01); *H04B 7/0871* (2013.01); *H04W 72/0493* (2013.01); *H04B 7/0628* (2013.01)

(58) Field of Classification Search
CPC .. H04B 7/0628; H04B 7/0871; H04B 7/0814; H04B 7/08; H04B 17/382; H04W 72/08; H04W 72/0493; H04W 88/06; H04W 72/04; H04L 1/0015; H04L 1/0017; H04L 1/0022; H04L 1/0025; H04L 1/0026; H04L 12/2869; H04L 12/5692; H04L 2012/5629
See application file for complete search history.

(56) References Cited

U.S. PATENT DOCUMENTS 6,314,293 B1 * 11/2001 Servi ..................... H04W 28/16
                                                  455/450
8,359,063 B1 *  1/2013 Pawar ................... H04L 5/0037
                                                  455/552.1

(Continued)

FOREIGN PATENT DOCUMENTS

CN        1941987 A      4/2007
CN      101472322 A      7/2009

(Continued)

OTHER PUBLICATIONS

International Search Report and Written Opinion received in Application No. PCT/CN2011/075282 mailed Mar. 15, 2012, 13 pages.

*Primary Examiner* — Meless Zewdu
(74) *Attorney, Agent, or Firm* — Slater Matsil, LLP

(57) ABSTRACT

Embodiments of the present invention disclose an antenna receiving mode configuration processing method, a base station controller, and a base station. When a user applies to a base station for establishing or adding radio links, an antenna receiving mode of the user is determined according to resource allocation information of the user. User admission processing is performed according to a channel element consumption rule that corresponds to the antenna receiving mode of the user. The base station controller includes a mode determining module and an admission processing module. The base station includes a configuring module, a monitoring module, and an adjusting module.

12 Claims, 7 Drawing Sheets

(56) References Cited

U.S. PATENT DOCUMENTS

| | | |
|---|---|---|
| 2002/0193146 A1* | 12/2002 | Wallace et al. ............... 455/562 |
| 2005/0141412 A1* | 6/2005 | Sadri et al. .................... 370/208 |
| 2007/0002765 A1* | 1/2007 | Kadaba et al. ................ 370/254 |
| 2007/0009016 A1* | 1/2007 | Tsutsui ......................... 375/219 |
| 2007/0105563 A1* | 5/2007 | Ro ........................ H04W 28/24 455/452.2 |
| 2009/0116384 A1* | 5/2009 | Kim et al. ..................... 370/230 |
| 2010/0093385 A1* | 4/2010 | Kazmi et al. ................. 455/517 |
| 2010/0113090 A1* | 5/2010 | Lin et al. ....................... 370/338 |
| 2011/0009100 A1* | 1/2011 | Oyane et al. ................ 455/414.1 |
| 2012/0281553 A1* | 11/2012 | Mujtaba et al. ............... 370/252 |

FOREIGN PATENT DOCUMENTS

| | | |
|---|---|---|
| CN | 101563858 A | 10/2009 |
| CN | 101990268 A | 3/2011 |
| EP | 1501218 A1 | 1/2005 |
| EP | 2464029 A1 | 6/2012 |
| WO | 2011015146 A1 | 2/2011 |

\* cited by examiner

METHOD FOR ANTENNA RECEIVING MODE CONFIGURATION PROCESSING, BASE STATION CONTROLLER AND BASE STATION

This application is a continuation of International Application No. PCT/CN2011/075282, filed on Jun. 3, 2011, which is hereby incorporated by reference in its entirety.

TECHNICAL FIELD

The present invention relates to communications technologies, and in particular, to an antenna receiving mode configuration processing method, a base station controller, and a base station.

BACKGROUND

In wideband code-division multiple access (WCDMA), CDMA2000, and other wireless communication systems, signals propagated in a wireless environment may experience fading that is generated due to factors such as multipath propagation and Doppler frequency shift. To cope with the fading, a receiving end may use a multi-antenna space diversity or polarization diversity technology to receive signals from different propagation paths on different antennas at the same time, and then perform combination processing on these signals, so as to reduce an impact of fading, which is referred to as diversity reception. Generally, the case where the receiving end has two antennas is referred to as 2-antenna reception, and the case where the receiving end has four antennas is referred to as 4-antenna reception. With the same transmitted signals and space propagation environment, 4-antenna receiving performance is higher than 2-antenna receiving performance, but 4-antenna consumed baseband resources are greater than 2-antenna consumed baseband resources.

An antenna receiving mode in the prior art is generally configured by taking a cell or a base station as granularity, that is, the same antenna receiving mode is configured for the same base station or one or several certain cells of the same base station, and the configured antenna receiving mode, for example, a 2-antenna or 4-antenna receiving mode, is used for uplink processing of all users in the base station or the cell.

However, in a method of the prior art, if a 4-antenna receiving mode is configured, investment requirements of relatively more hardware and baseband processing resources may be brought to operators, and if a 2-antenna receiving mode is configured, uplink receiving performance of every user may not be satisfied at the same time.

SUMMARY OF THE INVENTION

Embodiments of the present invention provide an antenna receiving mode configuration processing method, a base station controller, and a base station, so as to save operators' investment in hardware and baseband processing resources on the basis of satisfying uplink receiving performance of every user.

An embodiment of the present invention provides a configuration processing method for an antenna receiving mode, including when a user applies to a base station for establishing or adding radio links, determining an antenna receiving mode of the user according to resource allocation information of the user, and performing user admission processing according to a channel element (CE) consumption rule that is corresponding to the antenna receiving mode of the user.

An embodiment of the present invention provides a configuration processing method for an antenna receiving mode, including when a user applies for establishing or adding radio links, configuring an antenna receiving mode of the user as a first antenna receiving mode, monitoring in real time available baseband processing resources that currently remain and the number of license channel elements (CEs), and dynamically adjusting, according to a monitoring result, an antenna receiving mode of every user that already accesses.

An embodiment of the present invention provides a base station controller, including a mode determining module, configured to, when a user applies to a base station for establishing or adding radio links, determine an antenna receiving mode of the user according to resource allocation information of the user, and an admission processing module, configured to perform user admission processing according to a channel element (CE) consumption rule that is corresponding to the antenna receiving mode of the user.

An embodiment of the present invention provides a base station, including a configuring module, configured to, when a user applies for establishing or adding radio links, configure an antenna receiving mode of the user as a first antenna receiving mode, a monitoring module, configured to monitor in real time available baseband processing resources that currently remain and the number of license channel elements (CEs), and an adjusting module, configured to dynamically adjust, according to a monitoring result, an antenna receiving mode of every user that already accesses.

The embodiments of the present invention provide an antenna receiving mode configuration processing method, a base station controller, and a base station. When a user applies to a base station for establishing or adding radio links, a base station controller determines an antenna receiving mode of the user according to resource allocation information of the user, and performs admission processing for the user according to a CE consumption rule that is corresponding to the antenna receiving mode. In the embodiments, antenna receiving modes of different users in the same base station or cell are configured by taking a user as granularity, and therefore uplink receiving performance of every user may be satisfied respectively. Meanwhile, in the embodiments of the present invention, configuration is performed based on specific resource allocation information of the user, which may not cause unnecessary resource waste brought by blind configuration, thereby saving operators' investment in hardware and baseband processing resources.

BRIEF DESCRIPTION OF THE DRAWINGS

To illustrate technical solutions in embodiments of the present invention or in the prior art more clearly, accompanying drawings required for describing the embodiments or the prior art are introduced briefly in the following. Apparently, the accompanying drawings in the following description are some embodiments of the present invention, and persons of ordinary skill in the art may derive other drawings according to these accompanying drawings without creative efforts.

DETAILED DESCRIPTION OF ILLUSTRATIVE EMBODIMENTS

In order to make the objectives, technical solutions, and advantages of the embodiments of the present invention clearer, the technical solutions in the embodiments of the present invention are clearly and completely described in the following with reference to accompanying drawings in the embodiments of the present invention. Apparently, the embodiments described are a part of the embodiments rather than all of the embodiments of the present invention. Based on the embodiments of the present invention, all other embodiments obtained by persons of ordinary skill in the art without creative efforts shall all fall within the protection scope of the present invention.

Figure 1:
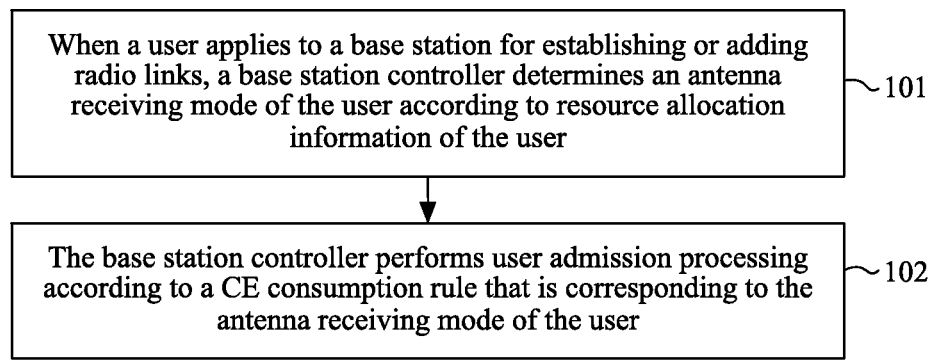
FIG. 1 is a flow chart of a first embodiment of a configuration processing method for an antenna receiving mode according to the present invention.

FIG. 1 is a flow chart of a first embodiment of a configuration processing method for an antenna receiving mode according to the present invention. As shown in FIG. 1, this embodiment provides a configuration processing method for an antenna receiving mode, and specifically adopts a static configuration method to configure an antenna receiving mode of a user, which may specifically include the following steps.

Step 101: When a user applies to a base station for establishing or adding radio links, a base station controller determines an antenna receiving mode of the user according to resource allocation information of the user.

When a user prepares to establish or add radio links in a certain cell of a base station, the user sends a corresponding radio link application to the base station. The base station controller may obtain the radio link application through the base station, and then according to resource allocation information of the user, determine the antenna receiving mode of the user, that is, in this embodiment, the base station controller configures the antenna receiving mode by taking a user as granularity.

Specifically, the resource allocation information of the user in this embodiment may include one or more combinations of the following information: service type of a user, channel quality of a user, priority information of a user, remaining available baseband processing resources, and the number of license (license) channel elements (Channel Element, hereinafter referred to as CE). The foregoing step in this embodiment may specifically be that, the base station controller determines the antenna receiving mode that should be used by the user according to one or several combinations of the foregoing resource allocation information of the user.

Specifically, in this embodiment, when a user applies to the base station for establishing or adding radio links, the base station controller may determine the antenna receiving mode of the user according to the service type of the user, and here, the service type of the user may be classified into a voice user and a data user according to factors such as a service quality requirement of the service used by the user. If the user is a voice user and has a relatively high requirement of service quality, the antenna receiving mode of the user of this type may be uniformly configured as a first antenna receiving mode. The first antenna receiving mode in this embodiment may specifically be a 4-antenna receiving mode, and a subsequent second antenna receiving mode may specifically be a 2-antenna receiving mode, which will not be repeatedly described again.

When the user applies to the base station for establishing or adding radio links, the base station controller may also determine the antenna receiving mode of the user according to the channel quality of the user, and if the channel quality of the user is relatively low, the antenna receiving mode of the user may be preferentially and uniformly configured as the first antenna receiving mode. When a user applies to the base station for establishing or adding radio links, the base station controller may also determine the antenna receiving mode of the user according to the priority information of the user, for example, an antenna receiving mode of a gold user may be preferentially configured as the first antenna receiving mode.

When a user applies to the base station for establishing or adding radio links, the base station controller may also determine the antenna receiving mode of the user according to available baseband processing resources that currently remain or the number of license CEs. In this embodiment, when a user applies to the base station for establishing or adding radio links, the base station controller may also determine the antenna receiving mode of the user comprehensively according to the service type of the user, the channel quality of the user, the priority information of the user, the remaining available baseband processing resources or the number of license CEs.

Step 102: The base station controller performs user admission processing according to a CE consumption rule that is corresponding to the antenna receiving mode of the user.

This embodiment adopts the static configuration method, where after determining through the foregoing step the antenna receiving mode subsequently and uniformly used by the user, the base station controller performs admission processing for the user according to the CE consumption rule that is corresponding to the antenna receiving mode, and the base station controller notifies the base station of the antenna receiving mode that should be used by the user. After receiving a notification message from the base station controller, the base station allocates corresponding antenna baseband processing resources to the user. Further, these antenna baseband processing resources are maintained using in a whole life cycle of the radio links established or added by the user.

This embodiment provides the antenna receiving mode configuration method. When the user applies to the base station for establishing or adding radio links, the base station controller determines the antenna receiving mode of the user according to the resource allocation information of the user, and performs admission processing for the user according to the CE consumption rule that is corresponding to the antenna receiving mode. In this embodiment, antenna receiving modes of different users in the same base station or cell are configured by taking a user as granularity, and therefore uplink receiving performance of every user may be satisfied respectively. Meanwhile, in this embodiment, configuration is performed based on specific resource allocation information of the user, which may not cause unnecessary resource waste brought by blind configuration, thereby saving operators' investment in hardware and baseband processing resources.

Figure 2:
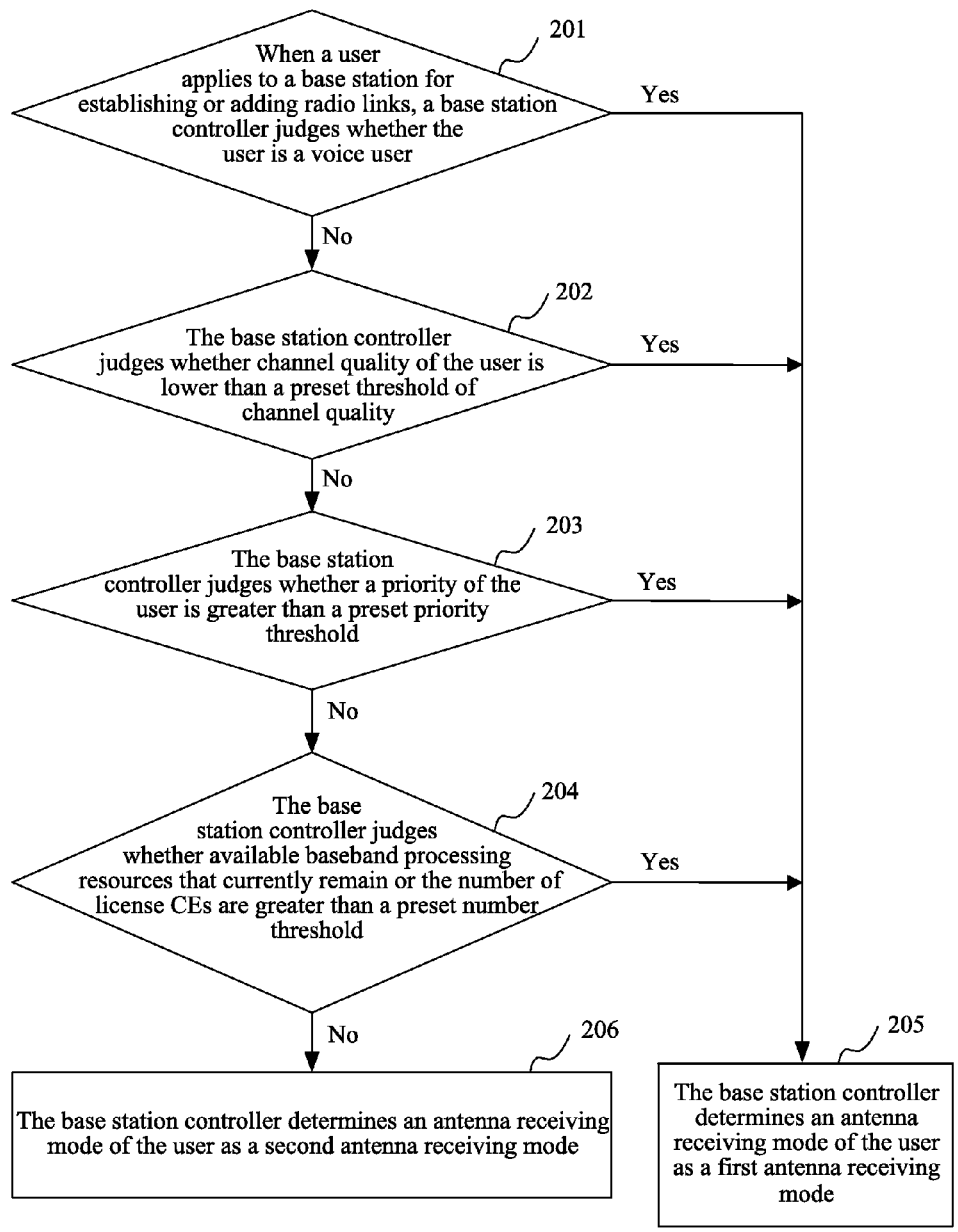
FIG. 2 is a flow chart of a second embodiment of a configuration processing method for an antenna receiving mode according to the present invention.

FIG. 2 is a flow chart of a second embodiment of a configuration processing method for an antenna receiving mode according to the present invention. As shown in FIG. 2, this embodiment provides a configuration processing method for an antenna receiving mode, where the configuration processing method is specifically a static configuration method and may specifically include the following steps.

Step 201: When a user applies to a base station for establishing or adding radio links, a base station controller judges whether the user is a voice user, and if yes, perform step 205; otherwise, perform step 202.

In this embodiment, when learning that the user applies to the base station for establishing or adding the radio links, the base station controller first judges whether the user is a voice user. If the user is a voice user, since the voice user consumes a relatively small number of CEs and has relatively big mobility and a relatively high requirement of service quality, step 205 is performed, and the antenna receiving mode of the user is directly configured as a first antenna receiving mode, that is, a 4-antenna receiving mode. If the user is a data service, the antenna receiving mode of the user may be determined by comprehensively taking other resource allocation information of the user into consideration, and subsequent step 202 is performed continuously.

Step 202: The base station controller judges whether channel quality of the user is lower than a preset threshold of channel quality, and if yes, perform step 205; otherwise, perform step 203.

When judging that the user is a data user, the base station controller continues to judge whether the channel quality of the user is lower than the preset threshold of channel quality. Specifically, the channel quality of the user may be obtained in different manners according to a state type of the user. If the user is a newly accessing user, the base station controller may obtain information of an environment where the user resides, according to information reported by the user when the user accesses, such as a signal interference rate (Ec/Io) and received signal code power (Received Signal Code Power, hereinafter referred to as RSCP), where the information of the environment is specifically information of a wireless environment.

If the user is a handover user, the base station controller may obtain information of a wireless environment where the user resides according to the information reported by the user in a measurement report, such as Ec/Io and RSCP; and then obtain specific channel quality of the user according to the information of the wireless environment. Whether the channel quality of the user is lower than the preset threshold of channel quality is judged in this step; if yes, it indicates that the channel quality of the user is relatively poor, and step 205 is performed to configure the antenna receiving mode of the user as the first antenna receiving mode, so that the user may preferentially use antenna baseband processing resources that is corresponding to the 4-antenna receiving mode. If the channel quality of the user is greater than or equal to the preset threshold of channel quality, the antenna receiving mode of the user may be determined by comprehensively taking other resource allocation information of the user into consideration, and subsequent step 203 is performed continuously.

Step 203: The base station controller judges whether a priority of the user is greater than a preset priority threshold, and if yes, perform step 205; otherwise, perform step 204.

When judging that the user is a data user, and the channel quality of the user is greater than or equal to the preset threshold of channel quality, the base station controller continues to judge whether the priority of the user is greater than the preset priority threshold; and if yes, step 205 is performed, and the antenna receiving mode of the user may be preferentially determined as the first antenna receiving mode. If the priority of the user is smaller than the preset priority threshold, subsequent step 204 is performed continuously, and the antenna receiving mode of the user is determined by comprehensively taking other resource allocation information of the user into consideration.

Step 204: The base station controller judges whether available baseband processing resources that currently remain or the number of license CEs are greater than a preset number threshold, and if yes, perform step 205; otherwise, perform step 206.

When judging that the user is a data user, the channel quality of the user is greater than or equal to the preset threshold of channel quality, and the priority of the user is smaller than the preset priority threshold, the base station controller continues to judge whether the available baseband processing resources that currently remain or the number of license CEs are greater than the preset number threshold; if yes, it indicates that current resources are relatively sufficient, and step 205 is performed to determine the antenna receiving mode of the user as the first antenna receiving mode. If the available baseband processing resources that currently remain or the number of license CEs are smaller than the preset number threshold, step 206 is performed to determine the antenna receiving mode of the user as a second antenna receiving mode, and reserve resources for later potential requirements.

In this embodiment, when the antenna receiving mode is configured according to user resource information, if merely several certain factors among the service type of the user, the channel quality of the user, the priority information of the user, the remaining available baseband processing resources, and the number of license CEs are considered, judgment may be performed successively according to the foregoing order. For example, it is assumed that only the service type of the user, the priority information of the user, and the number of license CEs are considered, the priority order is the service type of the user, the priority information of the user, and the number of license CEs in sequence.

Further, in this embodiment, if the base station controller finds that the available baseband processing resources that currently remain or the number of license CEs are smaller than the preset number threshold, and a newly established radio link matching judgment conditions of using the 4-antenna receiving mode appears subsequently, it indicates that current resources are already limited, and the base station controller manages resources of the base station to serve as one of the references for capacity expansion.

Step 205: The base station controller determines the antenna receiving mode of the user as the first antenna receiving mode, and ends the process.

If the service type of the user is a voice user, or if the channel quality of the user is lower than the preset threshold of channel quality, or if the priority of the user is greater than the preset priority threshold, or if the available baseband processing resources that currently remain or the number of license CEs are greater than the preset number threshold, the antenna receiving mode of the user is determined as the first antenna receiving mode, that is, the 4-antenna receiving mode.

Step 206: The base station controller determines the antenna receiving mode of the user as the second antenna receiving mode.

If the service type of the user is a data user, the channel quality of the user is greater than or equal to the channel quality threshold, the priority of the user is smaller than or equal to the priority threshold, and the available baseband processing resources that currently remain or the number of license CEs are smaller than or equal to the preset number threshold, the antenna receiving mode of the user is determined as the second antenna receiving mode, that is, a 2-antenna receiving mode.

This embodiment provides the configuration method for the antenna receiving mode. When a user applies to the base station for establishing or adding radio links, the base station controller determines the antenna receiving mode of the user according to the resource allocation information of the user, and performs admission processing for the user according to a CE consumption rule that is corresponding to the antenna receiving mode. In this embodiment, antenna receiving modes of different users in the same base station or cell are configured by taking a user as granularity, and therefore uplink receiving performance of every user may be satisfied respectively. Meanwhile, in this embodiment, the configuration is performed based on specific resource allocation information of the user, which may not cause unnecessary resource waste brought by blind configuration, thereby saving operators' investment in hardware and baseband processing resources.

Figure 3:
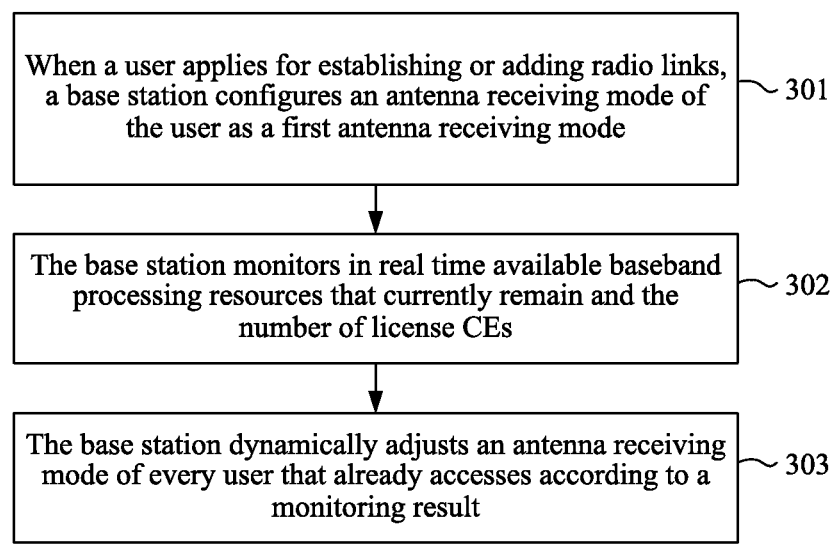
FIG. 3 is a flow chart of a third embodiment of a configuration processing method for an antenna receiving mode according to the present invention.

FIG. 3 is a flow chart of a third embodiment of a configuration processing method for an antenna receiving mode according to the present invention. As shown in FIG. 3, this embodiment provides a configuration processing method for an antenna receiving mode, where the configuration processing method is specifically a dynamic configuration manner and may specifically include the following steps.

Step 301: When a user applies for establishing or adding radio links, a base station configures an antenna receiving mode of the user as a first antenna receiving mode.

When a user prepares to establish or add radio links in a certain cell of the base station, the user sends a corresponding radio link application to the base station, and a base station controller may obtain the radio link application through the base station and then perform user admission processing uniformly according to a CE consumption rule that is corresponding to the first antenna receiving mode. The first antenna receiving mode in this embodiment may specifically be a 4-antenna receiving mode, and a subsequent second antenna receiving mode may specifically be a 2-antenna receiving mode; definitely, the first antenna receiving mode may also specifically be the 2-antenna receiving mode, and the second antenna receiving mode may also specifically be a 4-antenna receiving mode. Here examples are given only for convenience of the subsequent description, but it is preferentially configured as the 4-antenna receiving mode. After the user admission succeeds, the base station first configures the antenna receiving mode of the user as the first antenna receiving mode, and the base station allocates antenna baseband processing resources that is corresponding to the 4-antenna receiving mode to the user.

Step 302: The base station monitors in real time available baseband processing resources that currently remain and the number of license CEs.

The base station performs initial configuration on the antenna receiving mode of a newly accessing user, and monitors in real time every user that already accesses, so as to dynamically adjust the antenna receiving mode of every user that already accesses according to a specific monitoring result in a subsequent step. In the step, the base station specifically monitors in real time the available baseband processing resources that currently remain and the number of license CEs in the network.

Step 303: The base station dynamically adjusts the antenna receiving mode of every user that already accesses according to a monitoring result.

The base station monitors in real time the available baseband processing resources that currently remain and the number of license CEs, and dynamically adjusts the antenna receiving mode of every user that accesses according to the monitoring result. If the available baseband processing resources that currently remain and the number of license CEs are relatively few, to satisfy a subsequent resource requirement of a newly accessing user or a handover user, the antenna receiving modes of some users that already access may be adjusted, for example, their antenna receiving modes are adjusted down. Further, if the available baseband processing resources that currently remain and the number of license CEs are sufficient, the users' antenna receiving modes that are adjusted down before may be recovered according to the actual situation, so as to provide better receiving quality for the users as far as possible. In this embodiment, the adjustment of the antenna receiving mode of the user that already accesses includes the case of maintaining the antenna receiving mode. For example, when a current antenna receiving mode is the 4-antenna receiving mode, the available baseband processing resources that currently remain and the number of license CEs are monitored, and if the available baseband processing resources that currently remain and the number of license CEs are sufficient, the current 4-antenna receiving mode may be maintained.

The foregoing step 303 may specifically be: If the monitoring result is that the available baseband processing resources that currently remain are smaller than a preset resource threshold, or the number of license CEs is smaller than a preset number threshold, the base station selects a user that meets a preset selection policy from the users that already access, and switches the antenna receiving mode of the selected user to the second antenna receiving mode. That is, if monitoring that either the available baseband processing resources that currently remain or the number of license CEs is smaller than a preset threshold, the base station selects some users that meet the preset selection policy from the users that already access, and adjusts the antenna receiving modes of the selected users down from the 4-antenna receiving mode to the 2-antenna receiving mode.

Specifically, in this embodiment, the user that meets the preset selection policy may specifically include a user whose service type is a data user and whose signal interference rate (Signal Interference Rate, hereinafter referred to as SIR) is greater than a preset SIR target value, and a user whose user rate satisfies a guarantee bit rate (Guarantee Bit Rate, hereinafter referred to as GBR) requirement and whose priority is smaller than a preset priority threshold. That is, if the base station monitors that the available baseband processing resources that currently remain are smaller than the preset resource threshold, or the number of license CEs is smaller than the preset number threshold, the base station selects, from the users that already access, a user whose service type is a data user and whose SIR is greater than a preset SIR target value, and adjusts the 4-antenna receiving mode of the user down to the 2-antenna receiving mode; or selects, from the users that already access, a user whose GBR and basic service requirement are already guaranteed and whose priority is relatively low, and adjusts the 4-antenna receiving mode of the user down to the 2-antenna receiving mode.

Alternatively, the foregoing step 303 may also be specifically: If the monitoring result is that the available baseband processing resources that currently remain are greater than or equal to the preset resource threshold, and the number of license CEs is greater than or equal to the preset number threshold, the base station recovers the antenna receiving mode of the user that is configured with the second antenna receiving mode among the users that already access to the first antenna receiving mode. That is, if the base station monitors that both the available baseband processing resources that currently remain and the number of license CEs exceed corresponding thresholds, the base station starts to recover the antenna receiving mode of the user that is configured with the 2-antenna receiving mode among the users that already access, and adjusts it up to the 4-antenna receiving mode.

This embodiment provides the configuration processing method for the antenna receiving mode. When a user applies for establishing or adding radio links, an initial antenna receiving mode of the user is configured as the first antenna receiving mode; subsequently, the available baseband processing resources that currently remain and the number of license CEs are monitored in real time, and the antenna receiving mode of every user that already accesses is adjusted according to the monitoring result. In this embodiment, antenna receiving modes of different users in the same base station or cell are configured by taking a user as granularity, and therefore uplink receiving performance of every user may be satisfied respectively. Meanwhile, in this embodiment, the antenna receiving mode of every user is adjusted according to a real-time monitoring result, which may not cause unnecessary resource waste brought by blind configuration, thereby saving operators' investment in hardware and baseband processing resources.

Figure 4:
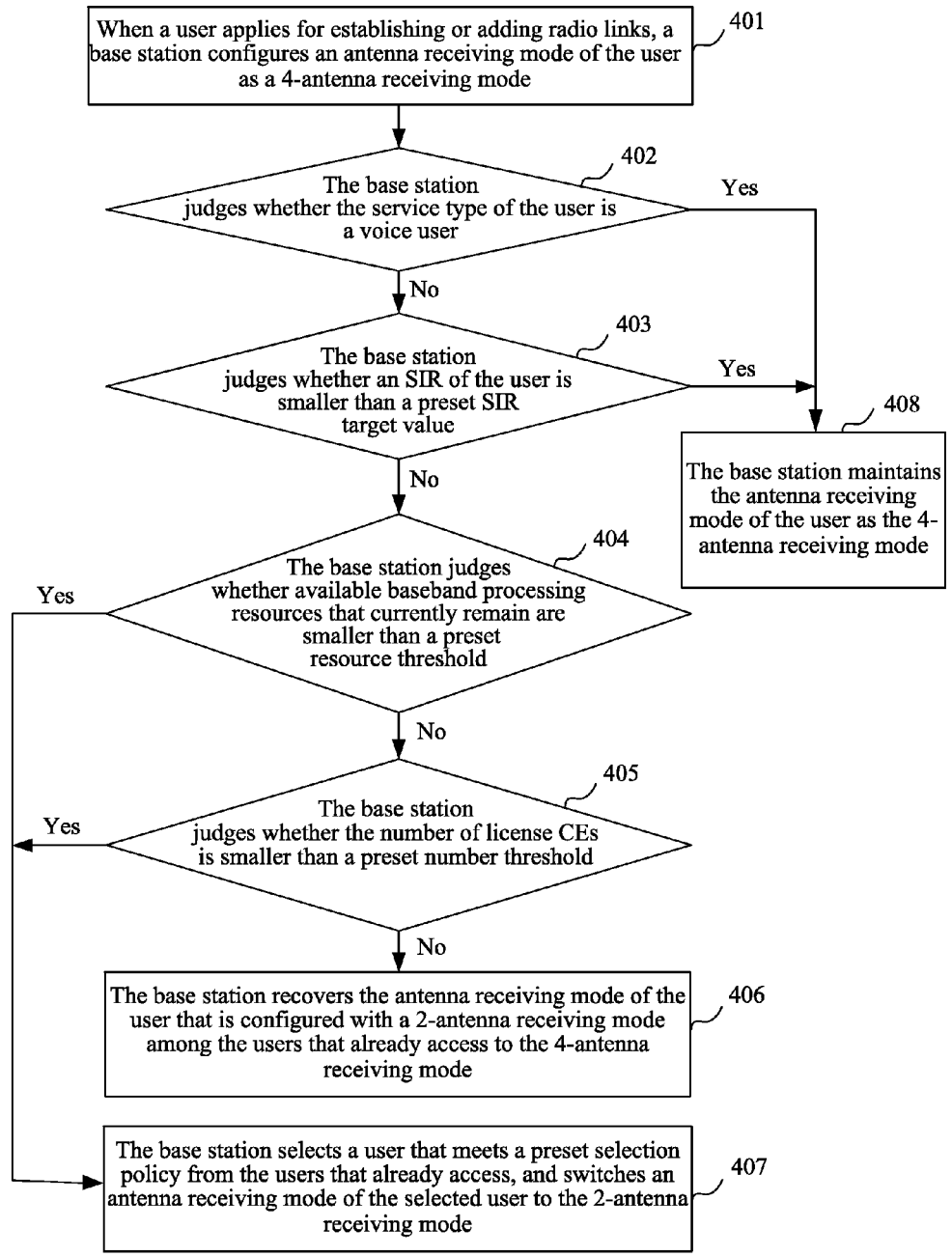
FIG. 4 is a flow chart of a fourth embodiment of a configuration processing method for an antenna receiving mode according to the present invention.

FIG. 4 is a flow chart of a fourth embodiment of a configuration processing method for an antenna receiving mode according to the present invention. As shown in FIG. 4, this embodiment provides a configuration processing method for an antenna receiving mode, where the configuration processing method is specifically a dynamic configuration manner and may specifically include the following steps.

Step 401: When a user applies for establishing or adding radio links, a base station configures an antenna receiving mode of the user as a 4-antenna receiving mode. This step may be similar to the foregoing step 301, and will not be repeatedly described here again.

Step 402: The base station judges whether service type of the user is a voice user, and if yes, perform step 408; otherwise, perform step 403.

After performing initial configuration on the antenna receiving mode of the user, the base station may monitor in real time the service type of the user, and judges whether the service type of the user is a voice user. If the user is a voice user, since the voice user consumes a relatively small number of CEs and has relatively high mobility and a relatively high requirement of service quality, sequent step 408 is performed, and the base station may maintain the 4-antenna receiving mode of the user. If the user is a data service, whether to adjust the antenna receiving mode of the user may be determined by comprehensively taking the channel quality of the user, the user rate, and other information into consideration, and subsequent step 403 is performed continuously.

Step 403: The base station judges whether an SIR of the user is lower than a preset SIR target value, and if yes, perform step 408; otherwise, perform step 404.

When learning that the user is a data user, the base station continues to judge whether the SIR of the user is smaller than the preset SIR target value. The base station may judge according to an uplink SIR measurement result of the user and an SIR target value of outer-loop power control. If the SIR of the user is always lower than the SIR target value or the convergence is rather difficult, it indicates that the user is at an edge of a cell, and the transmitting power thereof is limited, so that step 408 is performed, and the base station may continue to maintain the 4-antenna receiving mode of the user. If the SIR of the user is always higher than the SIR target value, which indicates that the user is relatively close to an antenna, it may be considered that the antenna receiving mode of the user is directly adjusted down to a 2-antenna receiving mode.

Step 404: The base station judges whether available baseband processing resources that currently remain are smaller than a preset resource threshold, and if yes, perform step 407; otherwise, perform step 405.

The base station monitors the available baseband processing resources that currently remain in the network, and judges whether the available baseband processing resources that currently remain are smaller than the preset resource threshold. If yes, subsequent step 407 is performed; otherwise, step 405 is performed to continue monitoring the number of license CEs in the network.

Step 405: The base station judges whether the number of license CEs is smaller than a preset number threshold, and if yes, perform step 407; otherwise, perform step 406.

If the available baseband processing resources that currently remain are greater than or equal to the preset resource threshold, but the number of license CEs is smaller than the preset number threshold, the base station also performs step 407. If the available baseband processing resources that currently remain are greater than or equal to the preset resource threshold, and the number of license CEs is greater than or equal to the preset number threshold, the base station performs step 406.

Step 406: The base station recovers the antenna receiving mode of the user that is configured with the 2-antenna receiving mode among the users that already access to the 4-antenna receiving mode, and ends the process.

If both the base station monitors that the available baseband processing resources that currently remain and the number of license CEs exceed corresponding thresholds, the base station starts to recover the antenna receiving mode of the user that is configured with the 2-antenna receiving mode among the users that already access, and adjusts the 2-antenna receiving mode up to the 4-antenna receiving mode.

Step 407: The base station selects a user that meets a preset selection policy from the users that already access, switches the antenna receiving mode of the selected user to the 2-antenna receiving mode, and ends the process.

If monitoring that either the available baseband processing resources that currently remain or the number of license CEs is smaller than a preset threshold, the base station selects some users that meet the preset selection policy from the users that already access, and adjusts the antenna receiving modes of the selected users down from the 4-antenna receiving mode to the 2-antenna receiving mode. Specifically, if the base station monitors that the available baseband processing resources that currently remain are smaller than the preset resource threshold, or the number of license CEs is smaller than the preset number threshold, the base station selects, from the users that already access, a user whose service type is a data user and whose SIR is greater than the preset SIR target value, and adjusts the 4-antenna receiving mode of the user down to the 2-antenna receiving mode; or selects, from the users that already access, a user that whose GBR and basic service requirement are already guaranteed and whose priority is relatively low, and adjusts the 4-antenna receiving mode of the user down to the 2-antenna receiving mode.

Step 408: The base station maintains the antenna receiving mode of the user as the 4-antenna receiving mode.

Further, in this embodiment, the base station also makes statistics on the usage condition of the antenna receiving mode. If the base station finds that the available baseband processing resources that currently remain or the number of license CEs are smaller than the preset number threshold, and fails to select a user that meets the preset selection policy subsequently, it indicates that current resources are already limited, and the base station manages the resources to serve as one of the references for capacity expansion.

This embodiment provides the configuration processing method for the antenna receiving mode. When a user applies for establishing or adding radio links, an initial antenna receiving mode of the user is configured as the 4-antenna receiving mode; subsequently, the available baseband processing resources that currently remain and the number of license CEs are monitored in real time, and the antenna receiving mode of every user that already accesses is adjusted according to a monitoring result. In this embodiment, antenna receiving modes of different users in the same base station or cell are configured by taking a user as granularity, and therefore uplink receiving performance of every user may be satisfied respectively. Meanwhile, in this embodiment, the antenna receiving mode of every user is adjusted according to a real-time monitoring result, which may not cause unnecessary resource waste brought by blind configuration, thereby saving operators' investment in hardware and baseband processing resources.

Figure 5:
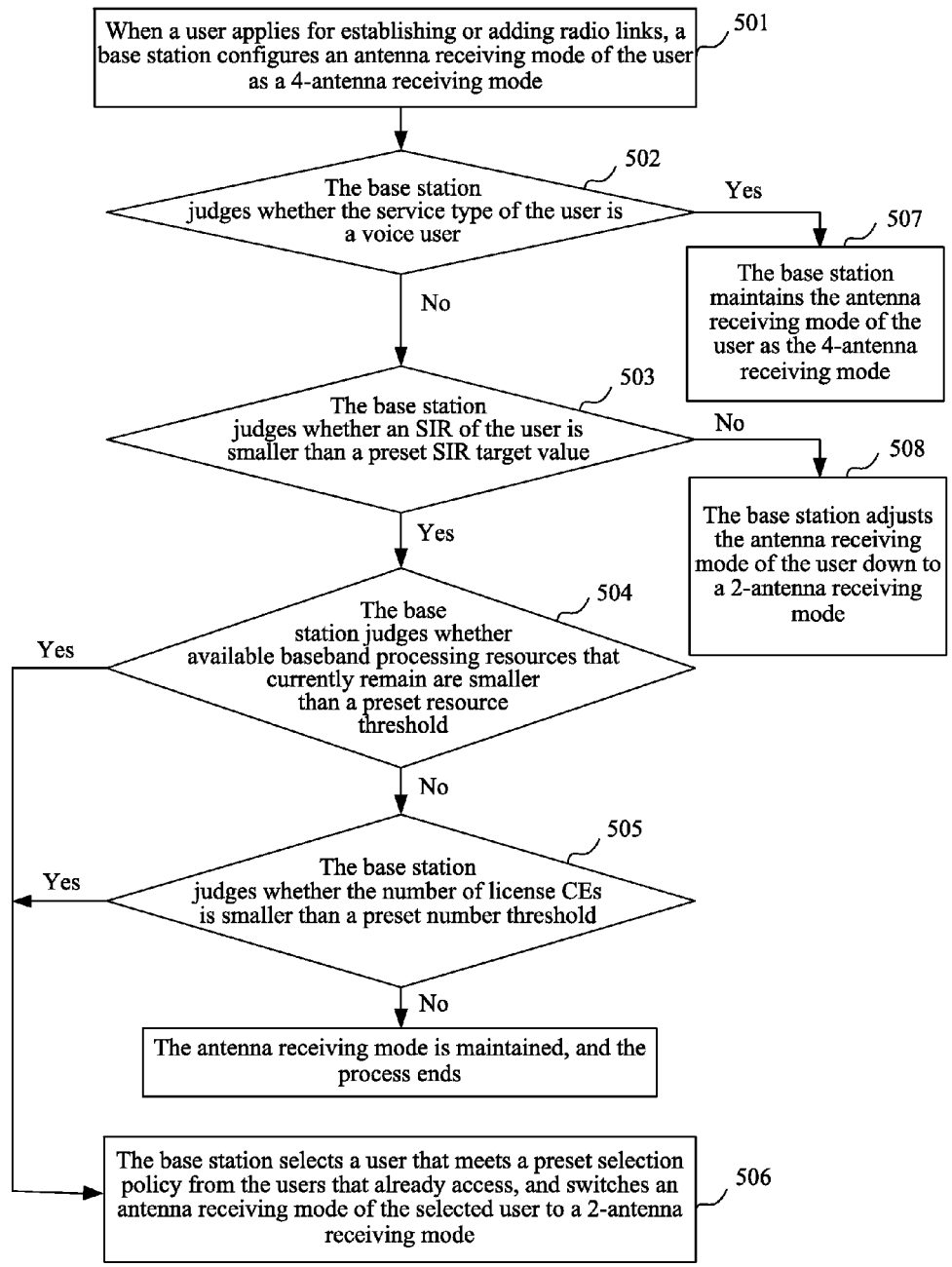
FIG. 5 is a flow chart of a fifth embodiment of a configuration processing method for an antenna receiving mode according to the present invention.

FIG. 5 is a flow chart of a fifth embodiment of a configuration processing method for an antenna receiving mode according to the present invention. As shown in FIG. 5, this embodiment provides a configuration processing method for an antenna receiving mode, where the configuration processing method is specifically a dynamic configuration manner and is a simplified form of the foregoing fourth embodiment, that is, a unidirectional adjustment from the 4-antenna receiving mode to the 2-antenna receiving mode is merely performed. This embodiment may specifically include the following steps.

Step 501: When a user applies for establishing or adding radio links, a base station configures an antenna receiving mode of the user as a 4-antenna receiving mode. This step may be similar to the foregoing step 301, and will not be repeatedly described here again.

Step 502: The base station judges whether the service type of the user is a voice user, and if yes, perform step 507; otherwise, perform step 503. This step may be similar to the foregoing step 402, and will not be repeatedly described here again.

Step 503: The base station judges whether an SIR of the user is lower than a preset SIR target value, and if yes, perform step 504; otherwise, perform step 508.

When learning through the foregoing judgment that the user is a data user, the base station monitors that the SIR of the user is always lower than the SIR target value or the convergence is rather difficult, which indicates that the user is already at an edge of a cell, and the transmitting power thereof is limited. If the user is currently configured with the 2-antenna receiving mode, it is not considered that the user is switched from the 2-antenna receiving mode to the 4-antenna receiving mode; and if the user is currently configured with the 4-antenna receiving mode, the antenna receiving mode is maintained. In this embodiment, if judging that the SIR of the user is lower than the preset SIR target value, the base station continues to perform subsequent step 504; otherwise, perform step 508 to adjust the antenna receiving mode of the user that is configured with the 4-antenna receiving mode down to the 2-antenna receiving mode.

Step 504: The base station judges whether available baseband processing resources that currently remain are smaller than a preset resource threshold, and if yes, perform step 506; otherwise, perform step 505. This step may be similar to the foregoing step 404, and will not be repeatedly described here again.

Step 505: The base station judges whether the number of license CEs is smaller than a preset number threshold, and if yes, perform step 506; otherwise, maintain the antenna receiving mode, and ends the process.

If the available baseband processing resources that currently remain are greater than or equal to the preset resource threshold, but the number of license CEs is smaller than the preset number threshold, the base station also performs step 506. If the available baseband processing resources that currently remain are greater than or equal to the preset resource threshold, and the number of license CEs is greater than or equal to the preset number threshold, it is not considered that the base station adjusts up the antenna receiving mode of the user, and the process ends.

Step 506: The base station selects a user that meets a preset selection policy from the users that already access, switches the antenna receiving mode of the selected user to the 2-antenna receiving mode, and ends the process. This step may be similar to the foregoing step 407, and will not be repeatedly described here again.

Step 507: The base station maintains the antenna receiving mode of the user as the 4-antenna receiving mode, and ends the process.

Step 508: The base station adjusts the antenna receiving mode of the user down to the 2-antenna receiving mode.

This embodiment provides the configuration processing method for the antenna receiving mode. When a user applies for establishing or adding radio links, an initial antenna receiving mode of the user is configured as the 4-antenna receiving mode. Subsequently, the available baseband processing resources that currently remain and the number of license CEs are monitored in real time, and the antenna receiving mode of every user that already accesses is adjusted according to a monitoring result. In this embodiment, antenna receiving modes of different users in the same base station or cell are configured by taking a user as granularity, and therefore uplink receiving performance of every user may be satisfied respectively. Meanwhile, in this embodiment, the antenna receiving mode of every user is adjusted according to a real-time monitoring result, which may not cause unnecessary resource waste brought by blind configuration, thereby saving operators' investment in hardware and baseband processing resources.

Persons of ordinary skill in the art may understand that implementation of all or a part of the steps of the foregoing method embodiments may be accomplished by a program instructing relevant hardware. The foregoing program may be stored in a computer readable storage medium. When the program is performed, the steps of the foregoing method embodiments are performed. And the foregoing storage medium includes various medium that may store program codes, such as a ROM, a RAM, a magnetic disk, or an optical disk.

Figure 6:
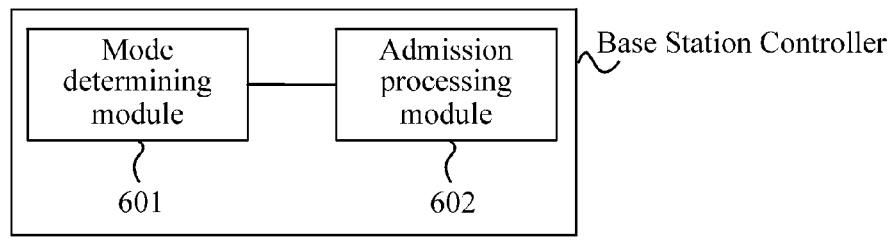
FIG. 6 is a structural diagram of a first embodiment of a base station controller according to the present invention.

FIG. 6 is a structural diagram of a first embodiment of a base station controller according to the present invention. As shown in FIG. 6, this embodiment provides a base station controller, which may specifically perform each step in the foregoing first method embodiment, and will not be repeatedly described here again. The base station controller provided by this embodiment may specifically include a mode determining module 601 and an admission processing module 602. The mode determining module 601 is configured to, when a user applies to a base station for establishing or adding radio links, determine an antenna receiving mode of the user according to resource allocation information of the user. The admission processing module 602 is configured to perform user admission processing according to a channel element (CE) consumption rule that is corresponding to the antenna receiving mode of the user.

Figure 7:
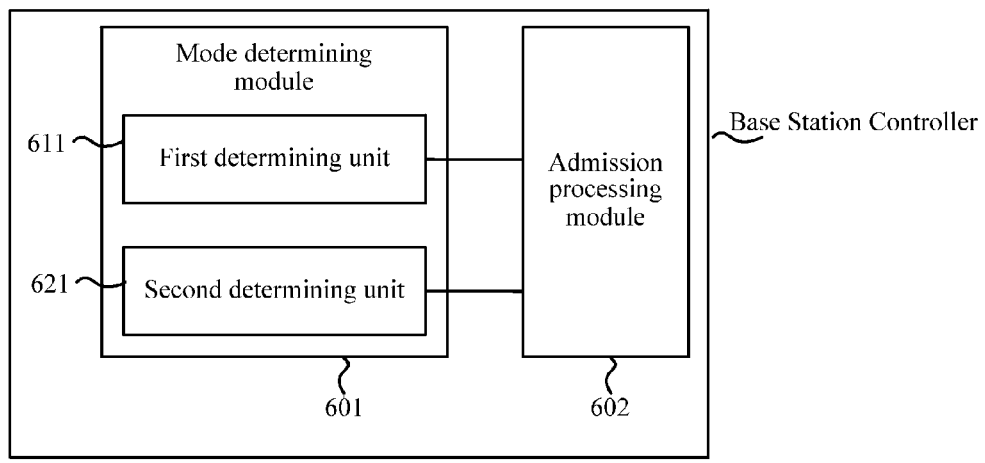
FIG. 7 is a structural diagram of a second embodiment of a base station controller according to the present invention.

FIG. 7 is a structural diagram of a second embodiment of a base station controller according to the present invention. As shown in FIG. 7, this embodiment provides a base station controller, which may specifically perform each step in the foregoing second method embodiment, and will not be repeatedly described here again. The mode determining module 601 of the base station controller provided by this embodiment may be specifically configured to, when a user applies to a base station for establishing or adding radio links, determine an antenna receiving mode of the user according to one or more combinations of the following information: service type of the user, channel quality of the user, priority information of the user, remaining available baseband processing resources, and the number of license CEs.

Further, the mode determining module 601 may specifically include a first determining unit 611 or a second determining unit 621. The first determining unit 611 is configured to, if the service type of the user is a voice user, or if the channel quality of the user is lower than a preset threshold of channel quality, or if the priority of the user is greater than a preset priority threshold, or if the available baseband processing resources that currently remain or the number of license CEs are greater than a preset number threshold, determine the antenna receiving mode of the user as a first antenna receiving mode. The second determining unit 621 is configured to, if the service type of the user is a data user, the channel quality of the user is greater than or equal to the channel quality threshold, the priority of the user is smaller than or equal to a priority threshold, and the available baseband processing resources that currently remain or the number of license CEs are smaller than or equal to the preset number threshold, determine the antenna receiving mode of the user as a second antenna receiving mode. Specifically, in this embodiment, the first antenna receiving mode may specifically be a 4-antenna receiving mode, and the second antenna receiving mode may specifically be a 2-antenna receiving mode.

This embodiment provides the base station controller. When a user applies to the base station for establishing or adding radio links, the base station controller determines the antenna receiving mode of the user according to resource allocation information of the user, and performs admission processing for the user according to a CE consumption rule that is corresponding to the antenna receiving mode. In this embodiment, antenna receiving modes of different users in the same base station or cell are configured by taking a user as granularity, and therefore uplink receiving performance of every user may be satisfied respectively. Meanwhile, in this embodiment, configuration is performed based on specific resource allocation information of the user, which may not cause unnecessary resource waste brought by blind configuration, thereby saving operators' investment in hardware and baseband processing resources.

Figure 8:
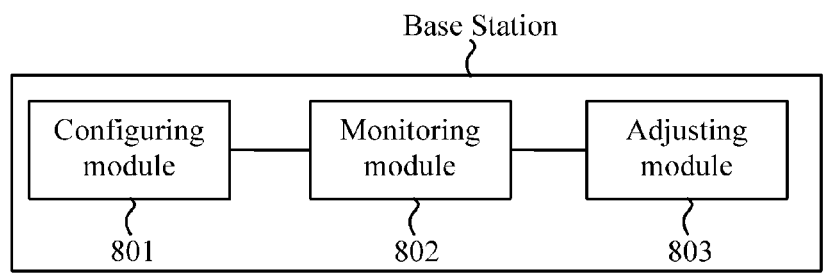
FIG. 8 is a structural diagram of a first embodiment of a base station according to the present invention.

FIG. 8 is a structural diagram of a first embodiment of a base station according to the present invention. As shown in FIG. 8, this embodiment provides a base station, which may specifically perform each step in the foregoing third method embodiment, and will not be repeatedly described here again. The base station provided by this embodiment may specifically include a configuring module 801, a monitoring module 802, and an adjusting module 803. The configuring module 801 is configured to, when a user applies for establishing or adding radio links, configure an antenna receiving mode of the user as a first antenna receiving mode. The monitoring module 802 is configured to monitor in real time available baseband processing resources that currently remain and the number of license channel elements (CEs). The adjusting module 803 is configured to dynamically adjust, according to a monitoring result, an antenna receiving mode of every user that already accesses.

Figure 9:
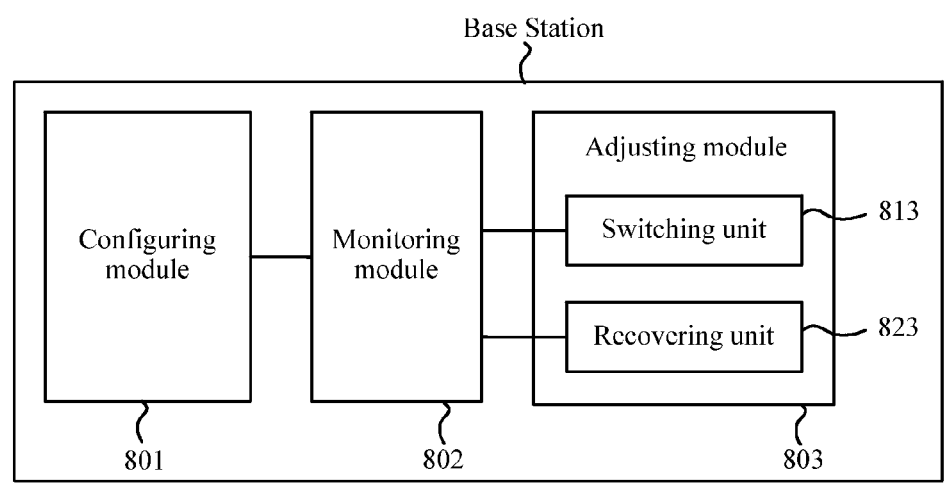
FIG. 9 is a structural diagram of a second embodiment of a base station according to the present invention.

FIG. 9 is a structural diagram of a second embodiment of a base station according to the present invention. As shown in FIG. 9, this embodiment provides a base station, which may specifically perform each step in the foregoing fourth method embodiment and fifth method embodiment, and will not be repeatedly described here again. The adjusting module 803 of the base station provided by this embodiment may include a switching unit 813 or a recovering unit 823. The switching unit 813 is configured to, if a monitoring result from the monitoring module 802 is that the available baseband processing resources that currently remain are smaller than a preset resource threshold, or the number of license CEs is smaller than a preset number threshold, select a user that meets a preset selection policy from the users that already access, and switch the antenna receiving mode of the selected user to a second antenna receiving mode. The recovering unit 823 is configured to, if the monitoring result from the monitoring module 802 is that the available baseband processing resources that currently remain are greater than or equal to the preset resource threshold, and the number of license CEs is greater than or equal to the preset number threshold, recover the antenna receiving mode of the user that is configured with the second antenna receiving mode among the users that already access to the first antenna receiving mode. The first antenna receiving mode is a 4-antenna receiving mode, and the second antenna receiving mode is a 2-antenna receiving mode.

Specifically, the switching unit 813 in this embodiment is specifically configured to, if the monitoring result from the monitoring module 802 is that the available baseband processing resources that currently remain are smaller than the preset resource threshold, or the number of license CEs is smaller than the preset number threshold, select, from the users that already access, a user whose service type is a data user and whose signal interference rate is greater than a preset target value of the signal interference rate, and a user whose user rate satisfies a guarantee bit rate (GBR) requirement and whose priority is smaller than a preset priority threshold; and switch the antenna receiving mode of the selected user to the second antenna receiving mode.

This embodiment provides the base station. When a user applies for establishing or adding radio links, an initial antenna receiving mode of the user is configured as the 4-antenna receiving mode. Subsequently, the available baseband processing resources that currently remain and the number of license CEs are monitored in real time, and the antenna receiving mode of every user that already accesses is adjusted according to the monitoring result. In this embodiment, antenna receiving modes of different users in the same base station or cell are configured by taking a user as granularity, and therefore uplink receiving performance of every user may be satisfied respectively. Meanwhile, in this embodiment, the antenna receiving mode of every user is adjusted according to a real-time monitoring result, which may not cause unnecessary resource waste brought by blind configuration, thereby saving operators' investment in hardware and baseband processing resources.

Finally, it should be noted that the foregoing embodiments are merely used for describing the technical solutions of the present invention, but not intended to limit the present invention. Persons of ordinary skill in the art should understand that, although the present invention has been described in detail with reference to the foregoing embodiments, modifications may still be made to the technical solutions recorded in the foregoing embodiments, or equivalent replacements may be made to some technical features in it; while these modifications or replacements will not make the essence of the corresponding technical solutions depart from the spirit and scope of the technical solutions of the embodiments in the present invention.

What is claimed is:

1. A configuration processing method for an antenna receiving mode, the method comprising:
   when a user device applies to a base station for establishing or adding radio links, determining, by a base station controller, an antenna receiving mode of the user device according to resource allocation information of the user device, wherein the resource allocation information of the user device comprises one of the following information: service type of the user device, priority information of the user device, remaining available baseband processing resources, and a number of license channel elements (CEs), or the resource allocation information of the user device comprises a combination of the following information: the service type of the user device, channel quality of the user device, the priority information of the user device, the remaining available baseband processing resources, and the number of license CEs; and
   performing, by the base station controller, user admission processing according to a channel element (CE) consumption rule that corresponds to the antenna receiving mode of the user device, wherein determining, by the base station controller, the antenna receiving mode comprises:
   if the service type of the user device is a voice user or if the channel quality of the user device is lower than a preset threshold of the channel quality or if the priority of the user device is greater than a preset priority threshold or if the available baseband processing resources that currently remain or the number of license CEs are greater than a preset number threshold, determining, by the base station controller, the antenna receiving mode of the user device as a first antenna receiving mode; and
   if the service type of the user device is a data user, the channel quality of the user device is greater than or equal to the preset threshold of the channel quality, the priority of the user device is smaller than or equal to the preset priority threshold, and the available baseband processing resources that currently remain or the number of license CEs are smaller than or equal to the preset number threshold, determining, by the base station controller, the antenna receiving mode of the user device as a second antenna receiving mode.

2. The method according to claim 1, wherein the first antenna receiving mode is a 4-antenna receiving mode and the second antenna receiving mode is a 2-antenna receiving mode.

3. The method according to claim 1, wherein the user device is a newly accessing user further comprising:
   obtaining, by the base station controller, information of an environment where the user device resides according to a signal interference rate and received signal code power that are reported by the user device when the user device accesses; and
   obtaining, by the base station controller, the channel quality of the user device according to the information of the environment where the user device resides.

4. The method according to claim 1, wherein the user device is a handover user, further comprising:
   obtaining, by the base station controller, information of an environment where the user device resides according to a signal interference rate and received signal code power that are reported by the user device in a measurement report; and
   obtaining, by the base station controller, the channel quality of the user device according to the information of the environment where the user device resides.

5. A configuration processing method for an antenna receiving mode, the method comprising:
   when a user device applies for establishing or adding radio links, configuring, by a base station, an antenna receiving mode of the user device as a first antenna receiving mode;
   obtaining, by the base station, a monitoring result by monitoring in real time available baseband processing resources that currently remain and a number of license channel elements (CEs); and
   dynamically adjusting, by the base station, according to the monitoring result, an antenna receiving mode of every user device that already accesses the base station, wherein dynamically adjusting, by the base station, the antenna receiving mode comprises:
   if the monitoring result indicates that the available baseband processing resources that currently remain are smaller than a preset resource threshold or the number of license CEs is smaller than a preset number threshold, selecting, by the base station, a user device that meets a preset selection policy from the user devices that already access the base station and switching, by the base station, the first antenna receiving mode of the selected user device to a second antenna receiving mode; and
   if the monitoring result indicates that the available baseband processing resources that currently remain are greater than or equal to the preset resource threshold and the number of license CEs is greater than or equal to the preset number threshold, restoring recovering, by the base station, the first antenna receiving mode of the user device that is configured with a second antenna receiving mode among the user device devices that already access the base station to the first antenna receiving mode.

6. The method according to claim 5, wherein the first antenna receiving mode is a 4-antenna receiving mode, and the second antenna receiving mode is a 2-antenna receiving mode.

7. The method according to claim 6, wherein the user device that meets the preset selection policy comprises:
   a user device whose service type is a data user and whose signal interference rate is greater than a preset target value of a signal interference rate; and
   a user device whose user rate satisfies a guarantee bit rate requirement and whose priority is smaller than a preset priority threshold.

8. A base station controller comprising:
   a mode determining module configured to determine an antenna receiving mode of a user device according to resource allocation information of the user device, when the user device applies to a base station for establishing or adding radio links; and an admission processing module configured to perform user admission processing according to a channel element (CE) consumption rule that corresponds to the antenna receiving mode of the user device, wherein the resource allocation information of the user device comprises one of the following information: service type of the user device, priority information of the user device, remaining available baseband processing resources, and a number of license CEs, or the resource allocation information of the user device comprises a combination of the following information: the service type of the user device, channel quality of the user device, the priority information of the user device, the remaining available baseband processing resources, and the number of license CEs, and wherein the mode determining module comprises:

a first determining unit configured to, if the service type of the user device is a voice user, or if the channel quality of the user device is lower than a preset threshold of channel quality or if the priority of the user device is greater than the preset priority threshold or if the available baseband processing resources that currently remain or the number of license CEs are greater than a preset number threshold, determine the antenna receiving mode of the user device as a first antenna receiving mode; and a second determining unit configured to, if the service type of the user device is a data user, the channel quality of the user device is greater than or equal to the preset threshold of channel quality, the priority of the user device is smaller than or equal to the priority threshold, and the available baseband processing resources that currently remain or the number of license CEs are smaller than or equal to the preset number threshold, determine the antenna receiving mode of the user device as a second antenna receiving mode.

9. The base station controller according to claim 8, wherein the first antenna receiving mode is a 4-antenna receiving mode, and the second antenna receiving mode is a 2-antenna receiving mode.

10. A base station comprising:

a configuring module configured to configure an antenna receiving mode of a user device as a first antenna receiving mode, when the user device applies for establishing or adding radio links;

a monitoring module configured to obtain a monitoring result by monitoring in real time available baseband processing resources that currently remain and a number of license channel elements (CEs); and an adjusting module configured to dynamically adjust, according to the monitoring result, an antenna receiving mode of every user device that already accesses the base station, wherein the adjusting module comprises:

a switching unit configured to, if the monitoring result from the monitoring module indicates that the available baseband processing resources that currently remain are smaller than a preset resource threshold or the number of license CEs is smaller than a preset number threshold, select a user device that meets a preset selection policy from the user devices that already access the base station, and switch the first antenna receiving mode of the selected user device to a second antenna receiving mode; and a recovering unit configured to, if the monitoring result from the monitoring module is that the available baseband processing resources that currently remain are greater than or equal to the preset resource threshold, and the number of license CEs is greater than or equal to the preset number threshold, recover restore the first antenna receiving mode of the user device that is configured with a second antenna receiving mode among users user devices that already access the base station the first antenna receiving mode.

11. The base station according to claim 10, wherein the first antenna receiving mode is a 4-antenna receiving mode, and the second antenna receiving mode is a 2-antenna receiving mode.

12. The base station according to claim 11, wherein the switching unit is specifically configured to, if the monitoring result from the monitoring module is that the available baseband processing resources that currently remain are smaller than the preset resource threshold or the number of license CEs is smaller than the preset number threshold, select, from the user devices that already access, a user device whose service type is a data user and whose signal interference rate is greater than a preset target value of the signal interference rate, and a user device whose user rate satisfies a guarantee bit rate requirement and whose priority is smaller than a preset priority threshold; and to switch the antenna receiving mode of the selected user device to the second antenna receiving mode.

* * * * *